United States Patent
Shin

(10) Patent No.: US 10,260,435 B2
(45) Date of Patent: Apr. 16, 2019

(54) ENGINE PROVIDED WITH CDA APPARATUS AND WATER PUMP AND METHOD FOR CONTROLLING THE SAME

(71) Applicant: HYUNDAI MOTOR COMPANY, Seoul (KR)

(72) Inventor: Gee Wook Shin, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 224 days.

(21) Appl. No.: 15/373,854

(22) Filed: Dec. 9, 2016

(65) Prior Publication Data

US 2018/0100457 A1    Apr. 12, 2018

(30) Foreign Application Priority Data

Oct. 12, 2016 (KR) .................. 10-2016-0132410

(51) Int. Cl.
| | |
|---|---|
| *F02D 17/02* | (2006.01) |
| *F02D 41/00* | (2006.01) |
| *F02D 35/02* | (2006.01) |
| *F02D 37/02* | (2006.01) |
| *F02M 25/022* | (2006.01) |

(Continued)

(52) U.S. Cl.
CPC ......... *F02D 41/0025* (2013.01); *F02D 17/02* (2013.01); *F02D 19/12* (2013.01); *F02D 35/027* (2013.01); *F02D 37/02* (2013.01); *F02D 41/0087* (2013.01); *F02M 25/0221* (2013.01); *F02M 25/0227* (2013.01); *F02M 25/03* (2013.01); *F02P 5/1522* (2013.01); *F02D 41/009* (2013.01); *F02D 2041/0012* (2013.01); *F02D 2200/023* (2013.01); *F02D 2200/0406* (2013.01); *F02D 2200/501* (2013.01); *F02D 2200/602* (2013.01); *Y02T 10/46* (2013.01)

(58) Field of Classification Search
CPC ........ F02D 17/02; F02D 19/12; F02D 35/027; F02M 25/0221; F02M 25/0227
See application file for complete search history.

(56) References Cited

U.S. PATENT DOCUMENTS

| | | | |
|---|---|---|---|
| 2007/0215069 A1 * | 9/2007 | Leone | F02D 19/0628 123/1 A |
| 2017/0159614 A1 * | 6/2017 | Miller | F02D 41/144 |

FOREIGN PATENT DOCUMENTS

| | | | | |
|---|---|---|---|---|
| JP | 2012-225319 A | 11/2012 | | |
| JP | 2012225319 A | * 11/2012 | ........... | F02D 35/027 |

* cited by examiner

*Primary Examiner* — Kevin A Lathers
(74) *Attorney, Agent, or Firm* — McDonnell Boehnen Hulbert & Berghoff LLP

(57) ABSTRACT

The present disclosure relates to an engine provided with cylinder deactivation ("CDA") apparatuses for at least some engine cylinders and provided with a water pump, and a method for controlling the same. The method for controlling the engine includes a controller: determining, based on output signals from vehicle driving information sensors, whether or not a current vehicle driving state corresponds to a CDA driving region; operating CDA apparatuses of some of the cylinders when the current vehicle driving state corresponds to the CDA driving region; determining whether or not detonation border lines ("DBLs") of respective cylinders the CDA apparatuses of which are not operated precede a minimum spark advance for best torque ("MBT"); and, when the DBLs precede the MBT, operating corresponding water injecting nozzles so as to inject water into the respective cylinders.

20 Claims, 5 Drawing Sheets

(51) Int. Cl.
*F02M 25/03* (2006.01)
*F02P 5/152* (2006.01)
*F02D 19/12* (2006.01)

ENGINE PROVIDED WITH CDA APPARATUS AND WATER PUMP AND METHOD FOR CONTROLLING THE SAME

CROSS-REFERENCE TO RELATED APPLICATION

This application claims priority to and the benefit of Korean Patent Application No. 10-2016-0132410 filed in the Korean Intellectual Property Office on Oct. 12, 2016, the entire contents of which are incorporated herein by reference.

BACKGROUND (a) Technical Field

The present disclosure relates to an engine provided with a cylinder deactivation ("CDA") apparatus and a water pump, and a method for controlling the same. More particularly, the present disclosure relates to an engine provided with a CDA apparatus and a water pump capable of improving fuel consumption by extending a CDA operation region, and a method for controlling the same.

(b) Description of the Related Art

Generally, an engine provided with a CDA apparatus operates the CDA apparatus in a low-speed low-load region to deactivate some of the engine cylinders.

When the engine is operated in a CDA mode, combustion cylinders are operated at a high load in order to compensate for the torques lost from deactivation of some cylinders.

In a high-load driving region, a detonation border line ("DBL") may be generated before a minimum spark advance for best torque ("MBT"). That is, spark advances of cylinders that are being operated are limited due to knocking, such that a driving region of the CDA mode is limited.

The above information disclosed in this Background section is only for enhancement of understanding of the background of the disclosure and therefore it may contain information that does not form the prior art that is already known in this country to a person of ordinary skill in the art.

SUMMARY

The present disclosure provides an engine having cylinder deactivation (CDA) apparatuses for at least some engine cylinders and having a water pump, and a method for controlling the same, which exhibits the advantage of extending a CDA operation region by injecting water into combustion cylinders when the engine provided with the CDA apparatus is operated in a CDA mode.

An example embodiment of the present disclosure provides a method for controlling an engine having CDA apparatuses for at least some engine cylinders and having a water pump, the method including: detecting, by a controller, vehicle driving information based on output signals from a plurality of sensors; based on the detected vehicle driving information, determining, by the controller, whether or not a current vehicle driving state corresponds to a CDA driving region; operating, by the controller, CDA apparatuses of some of the cylinders when the current vehicle driving state corresponds to the CDA driving region; determining, by the controller, whether or not DBLs of the respective cylinders of the CDA apparatuses which are not operated precede an MBT; and, when the DBLs precede the MBT, operating, by the controller, corresponding water injecting nozzles so as to inject water into the respective cylinders.

When the water pump is operated, the controller may apply a predetermined spark map as a function of water injection to control spark timings of the respective cylinders.

When the DBLs do not precede the MBT, the controller may apply a predetermined basic spark map to control the spark timings of the respective cylinders.

When water is injected so that ignition temperature is reduced and increases in ignition pressure are retarded, knocking may be surpressed, and an advanced spark timing map as a function of water injection may be applied rather than the basic spark map.

The DBLs and the MBT may be predetermined (e.g., by an experiment), and the controller may compare the predetermined DBLs and the MBT with each other to decide whether or not the DBLs precede the MBT.

The MBT may be predetermined, and the controller may compare an output signal of a knocking sensor and the MBT with each other to decide whether or not the DBLs precede the MBT.

When the current vehicle driving state corresponds to the CDA driving region, the controller may block a purge valve and calculate a target torque.

When the current vehicle driving state corresponds to the CDA driving region, the controller may control, based on a number of cylinders to be deactivated and the target torque, a quantity of air introduced into the engine.

The controller may determine whether or not the calculated target torque is maintained, and may additionally control the quantity of air introduced into the engine and the spark timing when the calculated target torque is not maintained.

When the controller determines that the target torque is maintained, the controller may select cylinders to be deactivated on the basis of current combustion cylinders, and the controller may transmit deactivation signals to the CDA apparatuses of the selected cylinders depending on a sequence of the selected cylinders, and block fuel injection and spark.

The engine may further include a valve timing apparatus, and when the current vehicle driving state corresponds to the CDA driving region, the controller may block a purge valve, fix an operation angle of the valve timing apparatus, and then calculate a target torque.

When the current vehicle driving state corresponds to the CDA driving region, the controller may control, based on a number of cylinders to be deactivated and the target torque, a quantity of air introduced into the engine, and may also control an operation of the valve timing apparatus.

When the controller determines that the target torque is maintained, the controller may select cylinders to be deactivated on the basis of current combustion cylinders, and the controller may transmit deactivation signals to the CDA apparatuses of the selected cylinders depending on a sequence of the selected cylinders, and block fuel injection and spark.

Another example embodiment of the present disclosure provides an engine having a CDA apparatus and a water pump, comprising: vehicle driving information sensors including a manifold absolute pressure sensor ("MAP"), a crank angle sensor, a vehicle speed sensor, an accelerator pedal sensor, and an oil temperature sensor; a memory in which an MBT map, a spark map as a function of water injection, and a basic spark map are stored; CDA apparatuses configured to deactivate valves of at least some of cylinders; a water injecting unit configured to inject water into at least some of cylinders; spark plugs configured to spark respective cylinders; injectors configured to inject fuel to the respective cylinders; a throttle valve; a purge valve; and a controller. When the controller determines, based on output signals from the vehicle driving information sensors, whether or not a current vehicle driving state corresponds to a CDA driving region, the controller blocks the purge valve, calculates a target torque, and, based on a number of cylinders to be deactivated and the target torque, controls a quantity of air introduced into the engine and a spark timing; the controller operates CDA apparatuses of some of the cylinders; the controller determines whether or not DBLs of given cylinders the CDA apparatuses of which are not operated precede an MBT; and, when the DBLs precede the MBT, the controller controls an operation of the water injecting unit to inject the water into the given cylinders, and applies the spark map as a function of water injection to control operations of the spark plugs of the given cylinders.

When the DBLs do not precede the MBT, the controller may apply the basic spark map to control operations of the spark plugs.

The DBLs may be predetermined and be stored in the memory, and the controller may compare the DBLs and the MBT with each other to decide whether or not the DBLs precede the MBT.

The engine provided with a CDA apparatus and a water pump may further include a knocking sensor, where the controller compares an output signal of the knocking sensor and the MBT with each other to decide whether or not the DBLs precede the MBT.

The engine provided with a CDA apparatus and a water pump may further include a valve timing apparatus, where when the current vehicle driving state corresponds to the CDA driving region, the controller fixes an operation angle of the valve timing apparatus and then calculates a target torque.

The water injecting unit may include nozzles configured to directly inject the water into corresponding cylinders, nozzles mounted in intake manifolds, and/or nozzles mounted below the throttle valve.

According to an example embodiment of an engine provided with a CDA apparatus and a water pump and the method for controlling the same, when the engine is operated in the CDA mode, the water is injected into the combustion cylinders to extend the CDA operation region, thereby making it possible to improve fuel consumption of the engine.

DETAILED DESCRIPTION

Figure 1:
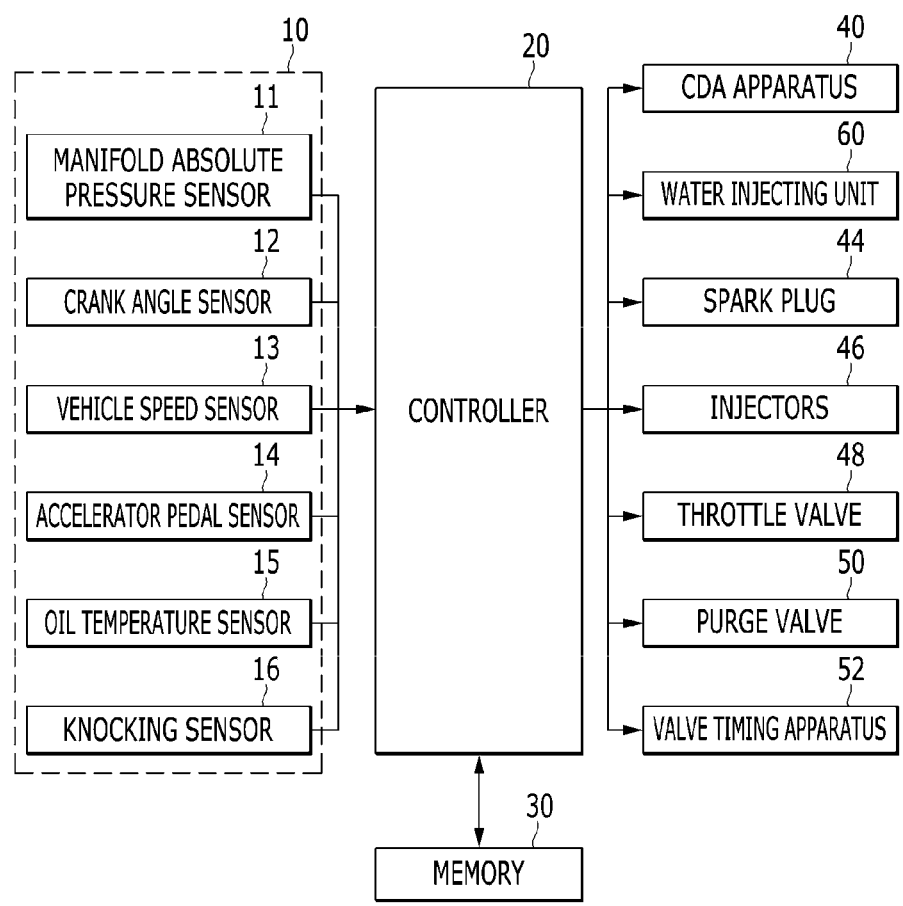
FIG. 1 is a block diagram of an example engine provided with a cylinder deactivation (CDA) apparatus and a water pump.

In the following detailed description, only certain example embodiments of the present disclosure have been shown and described, simply by way of illustration.

As those skilled in the art would realize, the described exemplary embodiments may be modified in various different ways, all without departing from the spirit or scope of the present disclosure.

Throughout the present specification, portions denoted by the same reference numerals mean the same components.

In the drawings, the thickness of layers, films, panels, regions, etc., are exaggerated for clarity.

It will be understood that when an element such as a layer, a film, a region, or a substrate is referred to as being "on" another element, it may be directly on another element or may have an intervening element present therebetween.

In contrast, when an element is referred to as being "directly on" another element, there are no intervening elements present.

Throughout the present specification, unless explicitly described to the contrary, the word "comprise" and variations such as "comprises" or "comprising", will be understood to imply the inclusion of stated elements but not the exclusion of any other elements.

An example embodiment of the present disclosure will hereinafter be described in detail with reference to the accompanying drawings.

Figure 2:
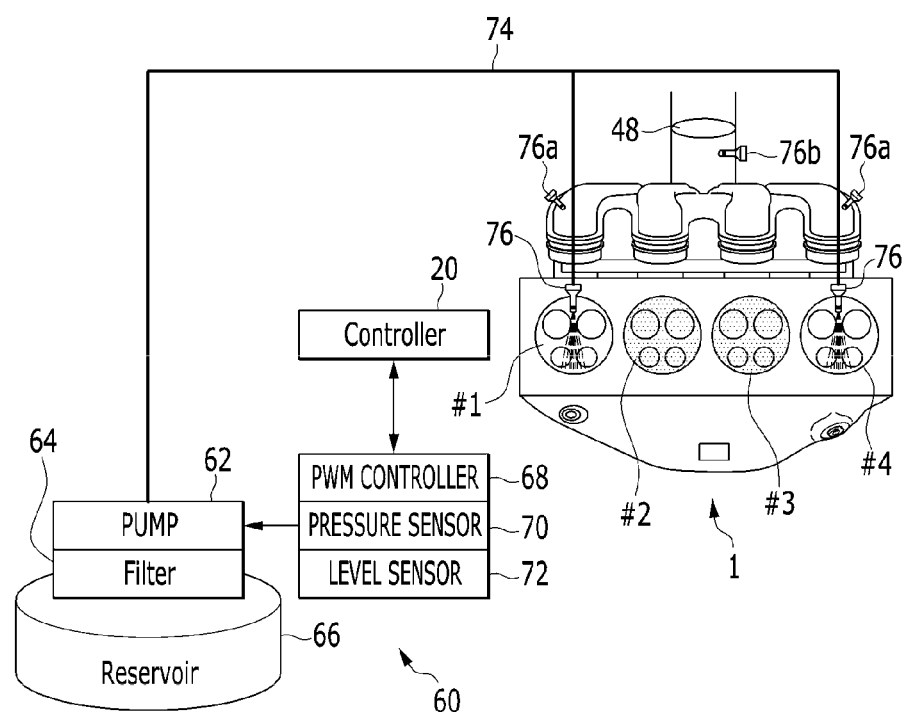
FIG. 2 is a view illustrating an example engine provided with a CDA apparatus and a water pump.

FIG. 1 is a block diagram of an example engine provided with a cylinder deactivation (CDA) apparatus and a water pump, and FIG. 2 is a view illustrating an example engine provided with a CDA apparatus and a water pump.

Referring to FIGS. 1 and 2, the example engine 1 includes vehicle driving information sensors 10 including an MAP 11, a crank angle sensor 12, a vehicle speed sensor 13, an accelerator pedal sensor 14, and an oil temperature sensor 15; a memory 30 in which an MBT map, a spark map as a function of water injection, a basic spark map, and a water injecting map are stored; CDA apparatuses 40 configured to deactivate valves of at least some engine cylinders of the engine; a water injecting unit 60 configured to inject water into at least some of the cylinders; spark plugs 44 configured to spark respective cylinders; injectors 46 configured to inject fuel to the respective cylinders; a throttle valve 48; a purge valve 50; and a controller 20.

The crank angle sensor 12 may be configured to sense rotation of a crank shaft and output a corresponding signal.

The vehicle speed sensor 13 may be configured to detect a current speed of a vehicle and output a corresponding signal.

The accelerator pedal sensor 14 may be configured to measure a rotation angle of an accelerator pedal operated by a driver and output a corresponding signal.

The oil temperature sensor 15 may be configured to measure a temperature of engine oil and output a corresponding signal.

The vehicle driving information sensors 10 may further include a knocking sensor 16, and the knocking sensor 16 may be configured to measure knocking and output a corresponding signal.

The MBT, which is a minimum spark advance for obtaining a best torque, may be obtained through an experiment (or may otherwise be predetermined), and may be stored as a map in the memory 30.

The water injecting unit 60 includes a water pump 62, a filter 64 configured to remove foreign materials of injected water, a reservoir 66 configured to hold water for injection into corresponding cylinders therein, a PWM controller 68 configured to output an operation signal of the water pump 62, a pressure sensor 70, a level sensor 72 configured to measure a water level of in the reservoir 66, a water supplying pipe 74, and water injecting nozzles 76 connected to the water supplying pipe 74 and configured to inject the water into the corresponding cylinders by a control of the controller 20. The pressure sensor 70 is configured to measure an operation pressure of the water pump 62 or a water pressure of the water supplying pipe 74 and output a corresponding signal.

Although engine 1 is illustrated in the drawings as having four cylinders (#1 to #4), other examples of the disclosed engine may include more or less cylinders.

Although an example in which the water injecting nozzles 76 are mounted to inject the water into first and fourth cylinders #1 and #4 has been illustrated in the drawings, in other examples the water injecting nozzles 76 may be mounted to inject the water into a different set of the four cylinders (e.g., second and third cylinders #2 and #3, or second and fourth cylinders #2 and #4). Moreover, in still other examples that include more or less cylinders, the water injecting nozzels may be mounted to inject the water into any one or more of those cylinders.

The water injecting unit 60 may include nozzles 76*a* mounted in intake manifolds, and the nozzles 76*a* may be provided in runners connected to the respective cylinders to inject the water into the corresponding cylinders.

In addition, the water injecting unit 60 may include a nozzle 76*b* mounted below the throttle valve 48, and the nozzle 76*b* may supply water mixed with air introduced into the respective cylinders, such that the water may be introduced into all of the cylinders.

The CDA apparatuses 40 may be mounted in some of the cylinders so as to deactivate some of the cylinders, or alternatively may be mounted in all of the cylinders so as to deactivate all of the cylinders.

The controller 20 receives signals output by corresponding sensors of the vehicle driving information sensors 10, and controls operations of the CDA apparatuses 40, the water injecting unit 60, the spark plugs 44, the injectors 46, the throttle valve 48, the purge valve 50, and the like, using various control maps, and the like, stored in the memory 30.

When the controller 20 controls an operation of the PWM controller 68 based on the output signals of the vehicle driving information sensors 10 and the water injecting map stored in the memory 30, a motor speed of the water pump 62 is adjusted through a control of the PWM controller 68.

The controller 20 may feedback-control the signal of the pressure sensor 70 to maintain a water pressure in the water supplying pipe 74 at a predetermined level.

Figure 3A:
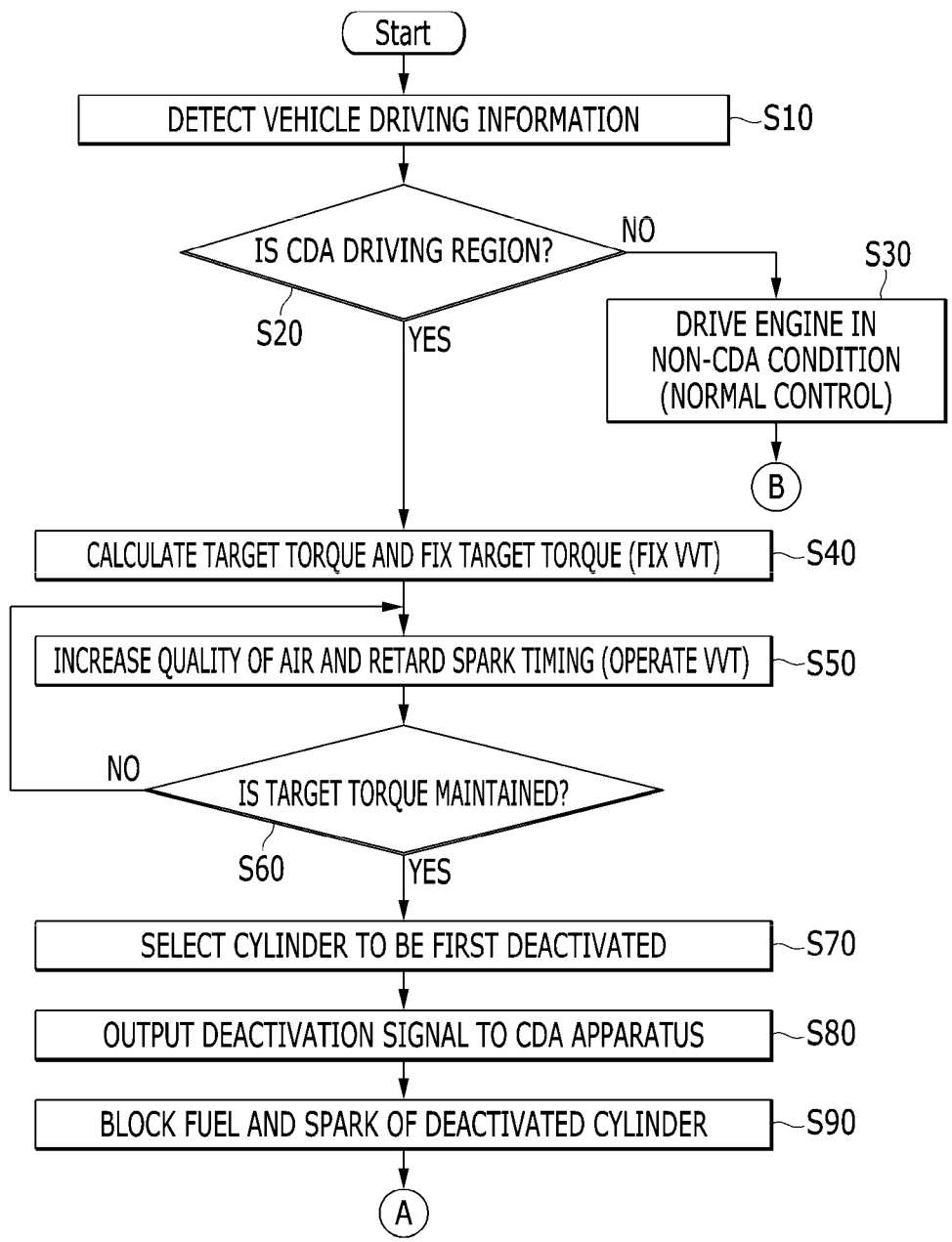
FIGS. 3A and 3B are flow charts illustrating an example method for controlling an example engine provided with a CDA apparatus and a water pump.
Figure 3B:
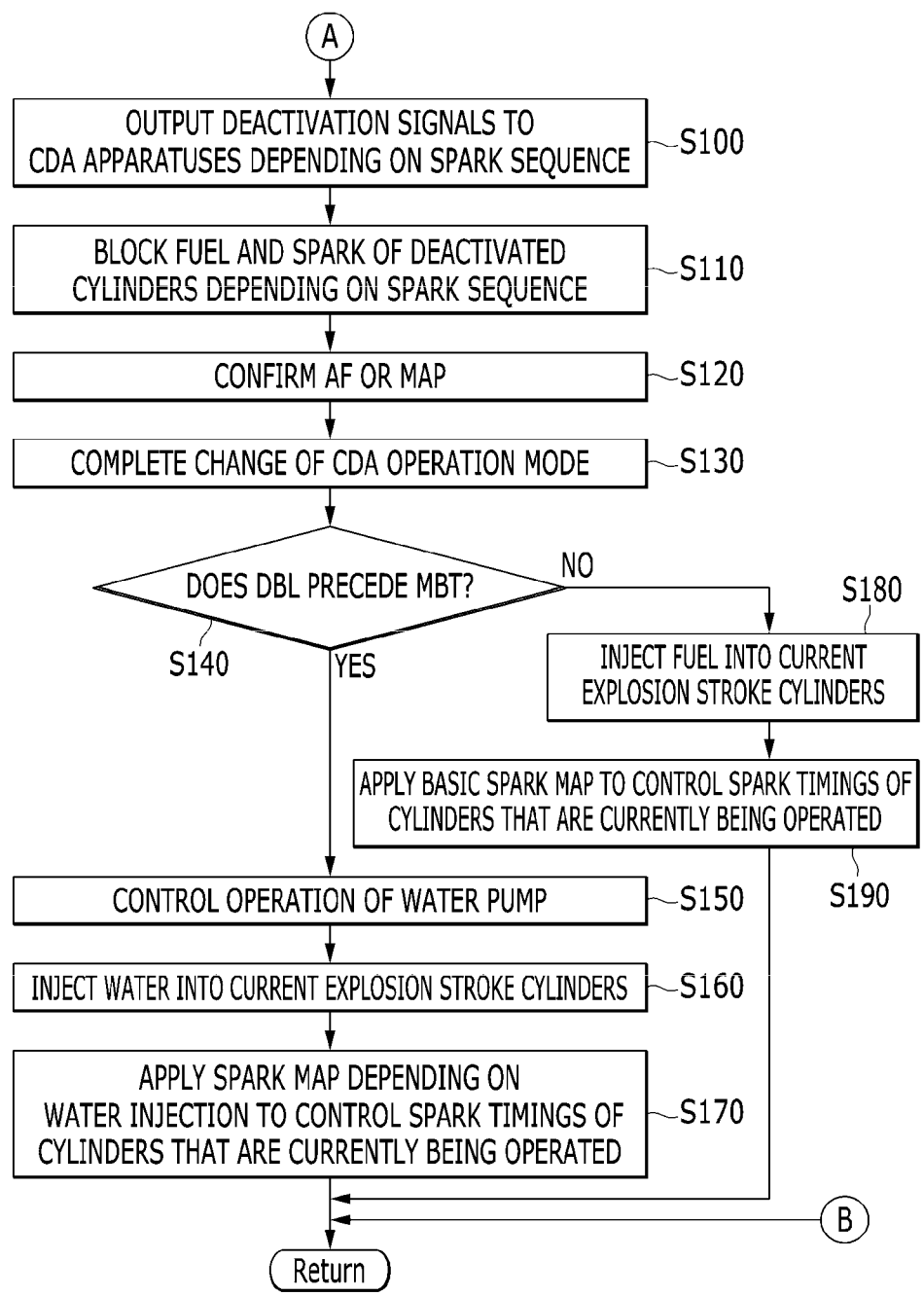

FIGS. 3A and 3B are flow charts illustrating an example method for controlling an example engine provided with a CDA apparatus and a water pump.

Referring to FIGS. 1 to 3, the example method for controlling an engine 1 may include the controller 20: detecting vehicle driving information based on the output signals received by the controller 20 from the vehicle driving information sensors 10 (S10), determining whether or not a current vehicle driving state corresponds to a CDA driving region based on the detected vehicle driving information (S20); operating CDA apparatuses 40 of some of the cylinders when the current vehicle driving state corresponds to the CDA driving region; determining whether or not DBLs of respective cylinders the CDA apparatuses 40 of which are not operated (i.e., the cylinders that are currently being operated) precede an MBT (S140); and, when the DBLs precede the MBT, operating the water pump 62 and the corresponding water injecting nozzles so as to inject the water into the respective cylinders (i.e., the cylinders that are not currently being operated) (S150 and S160).

When the water pump 62 is operated, the controller 20 may apply the predetermined spark map as a function of water injection to control spark timings of the cylinders that are currently being operated (S170).

When the DBLs do not precede the MBT, the fuel is injected into current explosion stroke cylinders (S180), and the controller 20 may apply the predetermined basic spark map to control the spark timings of the cylinders that are currently being operated (S190).

When the current vehicle driving state does not correspond to the CDA driving region, the controller 20 controls an operation of the engine 1 in a normal condition, that is, a non-CDA mode (S30).

When the current vehicle driving state corresponds to the CDA driving region, the controller 20 may block the purge valve 50 and calculate a target torque (S40).

Because a quantity of fuel introduced into the cylinders is changed when the purge valve 50 is operated, the controller 20 blocks the purge valve 50 and calculates the target torque.

When the current vehicle driving state corresponds to the CDA driving region, the controller 20 may use a number of cylinders to be deactivated and the target torque as a basis to control a quantity of air introduced into the engine and a spark timing. For example, when the CDA apparatuses 40 are mounted in only some of the cylinders and only some of the cylinders may be deactivated, the number of cylinders to be deactivated may be predetermined, and when the CDA apparatuses 40 are mounted in all of the cylinders and the controller 20 determines that some of the cylinders need to be deactivated depending on the target torque, the controller 20 may select cylinders to be deactivated (S70).

The target torque should not be substantially changed in order to allow the driver not to feel impact depending on a mode change in a CDA change process even though the engine enters a CDA mode or is released from the CDA mode.

However, because the deactivation of the cylinders is generated in the CDA mode, a quantity of air introduced into actual combustion cylinders should be increased in order to generate the same torque.

For example, in order to generate the same torque as that in an eight-cylinder mode in a four-cylinder mode, torques corresponding to the double of that in the eight-cylinder mode should be generated in actual combustion cylinders of the four-cylinder mode in order to maintain a total engine generation torque, and when two cylinders are driven by an operation of the CDA apparatuses in a four-cylinder engine, the sum of torques in two combustion cylinders should be the same as that of torques in four cylinders in an operation of a general mode.

However, because a quantity of air is not a physical quantity that may be rapidly changed, it may be necessary to increase/secure the quantity of air in advance before a CDA mechanism is actually changed, and a spark timing is retarded in order to maintain the target torque depending on the increase in the quantity of air (S50).

The currently calculated target torque is fixed, such that it may be maintained even after an operation mode of the engine 1 is changed into the CDA mode.

The controller 20 determines whether or not the calculated target torque may be maintained (S60), and may additionally control the quantity of air introduced into the engine 1 and the spark timing when the calculated target torque is not maintained. That is, the controller 20 may increase the quantity of air introduced into the engine 1 and additionally retard the spark timing.

In the control of the quantity of air and the spark timing, the controller 20 may control operation angles and operation timings of the throttle valve 48 and the spark plugs 44 to secure the quantity of air and retard the spark timing.

When it is determined that the target torque may be maintained, the controller 20 may select the cylinders to be deactivated on the basis of current combustion cylinders (S70), output deactivation signals to the CDA apparatuses 40 depending on a sequence of the selected cylinders (S80), and block fuel injection and spark (S90).

For example, when the number of cylinders to be deactivated is varied, the controller 20 may select the cylinders to be deactivated based on a consideration of the current combustion cylinders and a number of cylinders to be deactivated, and when physically pre-selected deactivated cylinders are present, the controller 20 may deactivate the CDA apparatuses 40 of the cylinders to be deactivated depending on a predetermined sequence and block the fuel injection and the spark.

The engine 1 further includes a valve timing apparatus 52, and when the current vehicle driving state corresponds to the CDA driving region, the controller 20 may block the purge valve 50, fix an operation angle of the valve timing apparatus 52, and then calculate the target torque (S40).

That is, the controller 20 may fix the operation angle of the valve timing apparatus 52 to suppress a change in a current torque and then calculate the target torque, thereby making it possible to minimize a change in a torque even through the operation mode of the engine 1 is changed.

When the engine 1 further includes the valve timing apparatus 52, and when the current vehicle driving state corresponds to the CDA driving region, the controller 20 may control, based on the number of cylinders to be deactivated and the target torque, the quantity of air introduced into the engine and the spark timing, and also control an operation of the valve timing apparatus 52 (S50).

As described above, because the quantity of air is not the physical quantity that may be rapidly changed, it may be necessary to increase/secure the quantity of air in advance before the CDA mechanism is actually changed, the spark timing is retarded in order to maintain the target torque depending on the increase in the quantity of air, and an operation of the valve timing apparatus 52 is controlled.

Here, the valve timing apparatus 52 may be any timing apparatus that may change or continuously change a valve timing.

When it is determined that the target torque may be maintained, the controller 20 may select the cylinders to be deactivated on the basis of the current combustion cylinders (S70), deactivate the CDA apparatuses 40 of the selected cylinders depending on the sequence of the selected cylinders (S80), and block the fuel injection and the spark (S90).

The controller 20 outputs deactivation signals to the CDA apparatuses 40 of the selected cylinders depending on a spark sequence (S100), and controls the injectors 46 and the spark plugs 44 to block the fuel and the spark of the deactivated cylinders (S110).

For example, the controller 20 outputs the deactivation signals to the CDA apparatuses 40 of second and third cylinders #2 and #3, and stops operations of the injectors 46 and the spark plugs 44.

In addition, the controller 20 measures a change in a flow rate of introduced air through an output signal of the manifold absolute pressure sensor (MAP) 11 (S120), and determines whether or not the change of the CDA operation mode is completed (S130).

That is, when a change in the flow rate of introduced air or an air pressure is in a predetermined range, the controller 20 determines that the change of the CDA operation mode is completed.

When the change of the CDA operation mode is completed, the controller 20 compares the DBLs and the MBT with each other depending on a current vehicle driving information signal (S140).

When water is injected so that ignition temperature is reduced and increases in ignition pressure are retarded, knocking may be surpressed, and an advanced spark timing map as a function of water injection may be applied rather than the basic spark map.

The DBLs are predetermined, and the controller 20 may compare the predetermined DBLs and the MBT with each other to decide whether or not the DBLs precede the MBT.

That is, the controller 20 may obtain information on the DBLs depending on the current vehicle driving information from the memory 30 and decide whether or not the DBLs precede the MBT.

As used herein, the phrase "the DBLs precede the MBT" means that the DBLs are generated before the MBT when the retarded spark timing is advanced.

The vehicle driving information sensors 10 may further include the knocking sensor 16 configured to identify whether or not knocking is generated and output a corresponding signal, and the controller 20 may compare the output signal of the knocking sensor 16 and the MBT with each other to decide whether or not the DBLs precede the MBT. That is, when the output signal of the knocking sensor 16 is generated before the MBT, the controller 20 may decide that the DBLs precede the MBT.

When the DBLs precede the MBT, the controller 20 may control an operation of the water injecting unit 60 to inject the water into the cylinders that are currently being operated, and apply the spark map as a function of water injection to control operations of the spark plugs 44 of the cylinders that are currently being operated. Therefore, the generation of knocking may be suppressed, and a driving region in the CDA mode may be further extended.

Figure 4:
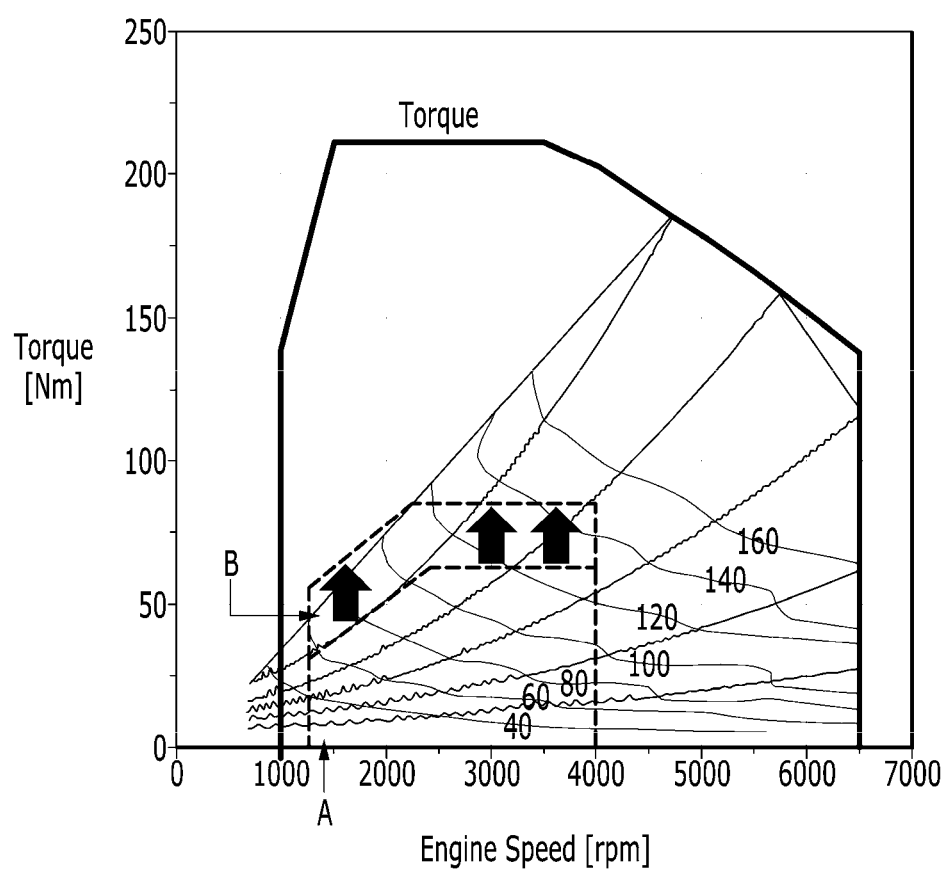
FIG. 4 is a graph illustrating a torque of an engine provided with a CDA apparatus and a water pump according to an example embodiment.

FIG. 4 is a graph illustrating a torque of an example engine provided with CDA apparatuses and a water pump.

As described above, a driving region in the CDA operation mode was limited due to the generation of knocking in the CDA driving mode (see region A). However, when knocking is generated or it is expected that knocking will be generated in the CDA driving mode, the water is injected into the cylinders to suppress knocking and allow the spark timing to be advanced, thereby making it possible to extend the driving region in the CDA operation mode (see region B).

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

<Description of symbols>

| | |
|---|---|
| 1: engine | 10: vehicle driving information sensors |
| 11: manifold absolute pressure sensor | 12: crank angle sensor |
| 13: vehicle speed sensor | 14: accelerator pedal sensor |
| 15: oil temperature sensor | 16: knocking sensor |

| <Description of symbols> | |
|---|---|
| 20: controller | 30: memory |
| 40: CDA apparatus | 44: spark plug |
| 46: injector | 48: throttle valve |
| 50: purge valve | 52: valve timing apparatus |
| 60: water injecting unit | 62: water pump |
| 64: filter | 66: reservoir |
| 68: PWM controller | 70: pressure sensor |
| 72: level sensor | 74: water supplying pipe |
| 76: water injecting nozzle | |

What is claimed is:

1. A method for controlling an engine provided with cylinder deactivation apparatuses for at least some engine cylinders and provided with a water pump, comprising:
   detecting, by a controller, vehicle driving information based on output signals from a plurality of sensors;
   based on the detected vehicle driving information, determining, by the controller, whether or not a current vehicle driving state corresponds to a cylinder deactivation apparatus driving region;
   operating, by the controller, cylinder deactivation apparatuses of some of the cylinders when the current vehicle driving state corresponds to the cylinder deactivation apparatus driving region;
   determining, by the controller, whether or not detonation border lines of respective cylinders the cylinder deactivation apparatuses of which are not operated precede a minimum spark advance for best torque; and
   when the detonation border lines precede the minimum spark advance for best torque, operating, by the controller, corresponding water injecting nozzles so as to inject water into the currently firing cylinders whose cylinder deactivation apparatuses are not being operated.

2. The method for controlling an engine of claim 1, wherein:
   when the water pump is operated, the controller applies a predetermined spark map as a function of water injection to control spark timings of the respective cylinders.

3. The method for controlling an engine of claim 2, wherein:
   when the detonation border lines do not precede the minimum spark advance for best torque, the controller applies a predetermined basic spark map to control the spark timings of the respective cylinders.

4. The method for controlling an engine of claim 1, wherein:
   the detonation border lines and the minimum spark advance for best torque are predetermined, and
   the controller compares the predetermined detonation border lines and the minimum spark advance for best torque with each other to decide whether or not the detonation border lines precede the minimum spark advance for best torque.

5. The method for controlling an engine of claim 1, wherein:
   the minimum spark advance for best torque is predetermined, and
   the controller compares an output signal of a knocking sensor and the minimum spark advance for best torque with each other to decide whether or not the detonation border lines precede the minimum spark advance for best torque.

6. The method for controlling an engine of claim 1, wherein:
   when the current vehicle driving state corresponds to the cylinder deactivation apparatus driving region, the controller blocks a purge valve and calculates a target torque.

7. The method for controlling an engine of claim 6, wherein:
   when the current vehicle driving state corresponds to the cylinder deactivation apparatus driving region, the controller controls, based on a number of cylinders to be deactivated and the target torque, a quantity of air introduced into the engine.

8. The method for controlling an engine of claim 7, wherein:
   the controller determines whether or not the calculated target torque is maintained, and additionally controls the quantity of air introduced into the engine and the spark timing when the calculated target torque is not maintained.

9. The method for controlling an engine of claim 8, wherein:
   when it is determined that the target torque is maintained, the controller selects cylinders to be deactivated on the basis of current combustion cylinders, and
   the controller outputs deactivation signals to the cylinder deactivation apparatus apparatuses of the selected cylinders depending on a sequence of the selected cylinders, and blocks fuel injection and spark.

10. The method for controlling an engine of claim 1, wherein:
    the engine further includes a valve timing apparatus, and when the current vehicle driving state corresponds to the cylinder deactivation apparatus driving region, the controller blocks a purge valve, fixes an operation angle of the valve timing apparatus, and then calculates a target torque.

11. The method for controlling an engine of claim 10, wherein:
    when the current vehicle driving state corresponds to the cylinder deactivation apparatus driving region, the controller controls, based on a number of cylinders to be deactivated and the target torque, a quantity of air introduced into the engine and a spark timing, and further controls an operation of the valve timing apparatus.

12. The method for controlling an engine of claim 11, wherein:
    when it is determined that the target torque is maintained, the controller selects cylinders to be deactivated on the basis of current combustion cylinders, and
    the controller outputs deactivation signals to the cylinder deactivation apparatuses of the selected cylinders depending on a sequence of the selected cylinders, and blocks fuel injection and spark.

13. An engine provided with cylinder deactivation apparatuses of at least some engine cylinders and provided with a water pump, wherein the cylinder deactivation apparatuses are configured to deactivate valves of at least some of the cylinders, comprising:
    vehicle driving information sensors including a manifold absolute pressure sensor (MAP), a crank angle sensor, a vehicle speed sensor, an accelerator pedal sensor, and an oil temperature sensor;
    a memory in which a minimum spark advance for best torque map, a spark map as a function of water injection, and a basic spark map are stored;

a water injecting unit configured to inject water into at least some of the cylinders, wherein the water injecting unit includes the water pump;

spark plugs configured to spark respective cylinders;

injectors configured to inject fuel to the respective cylinders;

a throttle valve;

a purge valve; and a controller, wherein the controller determines, based on output signals from the vehicle driving information sensors, whether or not a current vehicle driving state corresponds to a cylinder deactivation apparatus driving region, when the current vehicle driving state corresponds to the cylinder deactivation apparatus driving region, the controller blocks the purge valve, calculates a target torque, and controls, based on a number of cylinders to be deactivated and the target torque, a quantity of air introduced into the engine and a spark timing, the controller operates cylinder deactivation apparatuses of some of the cylinders, the controller determines whether or not detonation border lines of given cylinders the cylinder deactivation apparatuses of which are not operated precede a minimum spark advance for best torque, and when the detonation border lines precede the minimum spark advance for best torque, the controller controls an operation of the water injecting unit to inject the water into the given cylinders, and applies the spark map as a function of water injection to control operations of the spark plugs of the given cylinders.

14. The engine of claim 13, wherein:

when the detonation border lines do not precede the minimum spark advance for best torque, the controller applies the basic spark map to control operations of the spark plugs.

15. The engine of claim 14, wherein:

the detonation border lines are predetermined and are stored in the memory, and the controller compares the detonation border lines and the minimum spark advance for best torque with each other to decide whether or not the detonation border lines precede the minimum spark advance for best torque.

16. The engine of claim 14, further comprising:

a knocking sensor, wherein the controller compares an output signal of the knocking sensor and the minimum spark advance for best torque with each other to decide whether or not the detonation border lines precede the minimum spark advance for best torque.

17. The engine of claim 13, further comprising:

a valve timing apparatus, wherein when the current vehicle driving state corresponds to the cylinder deactivation apparatus driving region, the controller fixes an operation angle of the valve timing apparatus and then calculates a target torque.

18. The engine of claim 13, wherein:

the water injecting unit includes nozzles configured to directly inject the water into corresponding cylinders.

19. The engine of claim 13, wherein:

the water injecting unit includes nozzles mounted in intake manifolds.

20. The engine of claim 13, wherein:

the water injecting unit includes nozzles mounted below the throttle valve.

* * * * *